United States Patent [19]

Pesz et al.

[11] 3,748,401

[45] July 24, 1973

[54] RING TRIP CIRCUIT

[75] Inventors: Robert G. Pesz, Barrington; Robert T. Cleary, Lockport, both of Ill.

[73] Assignee: GTE Automatic Electric Laboratories Incorporated, Northlake, Ind.

[22] Filed: June 20, 1972

[21] Appl. No.: 264,673

[52] U.S. Cl. .................... 179/84 R

[51] Int. Cl. .................... H04m 3/02

[58] Field of Search .................... 179/84 R, 18 HB

[56] References Cited

UNITED STATES PATENTS 3,341,665 9/1967 Merkel et al. .................... 179/84 R

*Primary Examiner*—Thomas W. Brown

*Attorney*—K. Mullerheim, Lester N. Arnold et al.

[57] ABSTRACT

A ring trip arrangement for a ringing circuit including a ring trip relay operation by the conduction of an optical coupler which is operatively responsive to an answered condition. A light emitting diode conducts only in response to the flow of direct current caused by the off-hook condition, and is isolated from the alternating ringing current by an a.c. and noise immunity circuit. A driver amplifier circuit is provided to respond to minimum conduction of the light emitting diode and itself provide the drive to operate the ring trip delay.

8 Claims, 2 Drawing Figures

PATENTED JUL 24 1973 3,748,401

RING TRIP CIRCUIT

BACKGROUND OF THE INVENTION

This invention relates generally to communication switching systems, and more particularly, relates to a ring trip arrangement utilizing a phototransistor coupled pair for operating the ring trip relay to remove ringing current from the called line.

In a telephone transmission network connecting through exchange equipment the subscriber's stations of calling and called parties, there is provided means for intermittently ringing the called station through a ringing circuit having a ring trip arrangement operative to abruptly halt the ringing current upon the occurrence of an answered off-hook response. It is common practice to include this ringing circuit and its ring trip arrangement as a part of the exchange equipment. Ring trip arrangements must necessarily be generally fast-acting and highly sensitive to the answered condition so as to remove the ringing current from the called station before objectionable cross ringing occurs. Furthermore multi-party lines being simultaneously signaled sometimes present a relatively large magnitude of ringing current which can cause premature or false operation of the ring trip arrangement. Direct current faults within the system may also cause false operation of the ring trip arrangement.

In order to provide a fast-acting and highly sensitive ringing circuit which is compatible with extensive use of electronic circuitry within the exchange equipment, it is now popular to design ringing circuits to employ electronic devices for tripping the ring. One successful electronic device has been an optical coupler such as a phototransistor coupled pair having a light emitting diode source. This optical coupler offers operating speed and electrical isolation of the ring trip relay from the flow of alternating ringing current and electrical transients and surge conditions. However, since the phototransistor coupled pair is itself a sensitive electronic device, it is desirable to protect the light emitting diode from high potentials that may appear on the line due to the electrical transients and surge conditions.

In the prior art, ringing protector circuits which have employed optical couplers such as the phototransistor coupled pair appear to have one or more of several disadvantages, to wit: (1) subjecting the emitting diode to the flow of alternating ringing current; (2) failing to protect the emitting diode from inadvertently appearing electrical transients and surge conditions; and (3) operating the ring trip relay winding directly from the current flow of the photo transistor coupled pair while failing to compensate for the variations in operating characteristics between such optical transistors. One such circuit which suffers from some of these disadvantages is shown in the copending application entitled "Electronic Ring Trip Circuit," U.S. application Ser. No. 256,103, filed May 23, 1972 and assigned to the assignee of the present invention.

SUMMARY OF THE INVENTION

It is therefore an object of the present invention to provide a ring trip arrangement which employs a phototransistor coupled pair to provide electrical isolation for the ring trip relay and its preceding electronic driver circuit. It is another object of the invention to provide for the isolation of the light emitting diode of the phototransistor coupled pair from alternating ringing current and electrical transient conditions. It is still another object to provide a ring trip arrangement which is generally fast-acting and highly sensitive to a predetermined level of direct current for interrupting ringing current before objectionable cross ringing occurs. It is a further object to provide a ring trip arrangement comprised of electronic devices and components which are capable of being closely mounted on a printed circuit board. It is still a further object to provide a ring trip arrangement utilizing component parts of high reliability requiring only minimum component replacement.

A station connectible ringing circuit for a communication switching system is tranversed primarily during ringing intervals by alternating current and traversed by direct current as well when the ring is answered. The ringing circuit includes among other components an optical coupler in the form of a phototransistor coupled pair having a light emitting diode as the optical source. The light emitting diode is connected across resistor means in the form of a variable resistor, which variable resistor is connected within the ring R line of the subscriber loop circuit generally intermediately of the signaling-interrupter source and the subscriber station apparatus. Two shunt circuit combinations of capacitors and diodes are connected in series together and shunted across the variable resistor for providing a path for the positive and negative half cycles of alternating ringing current, respectively. Voltage breakdown means in the form of a plurality of series connected varistors are shunted across the variable resistor for providing a breakdown current path under high potential conditions caused by electrical transients and surges. A direct current path is provided through the light emitting diode so that the emitting diode conducts upon the occurrence of the off-hook response. Minimum conduction of the optical transistor causes a driver circuit to switch on and supply an amplified direct current to its load comprised of the winding of the ring trip relay.

Other objects and advantages of the invention will occur to those skilled in the art as the invention is described in connection with the accompanying drawing in which:

DETAILED DESCRIPTION

Figure 1:
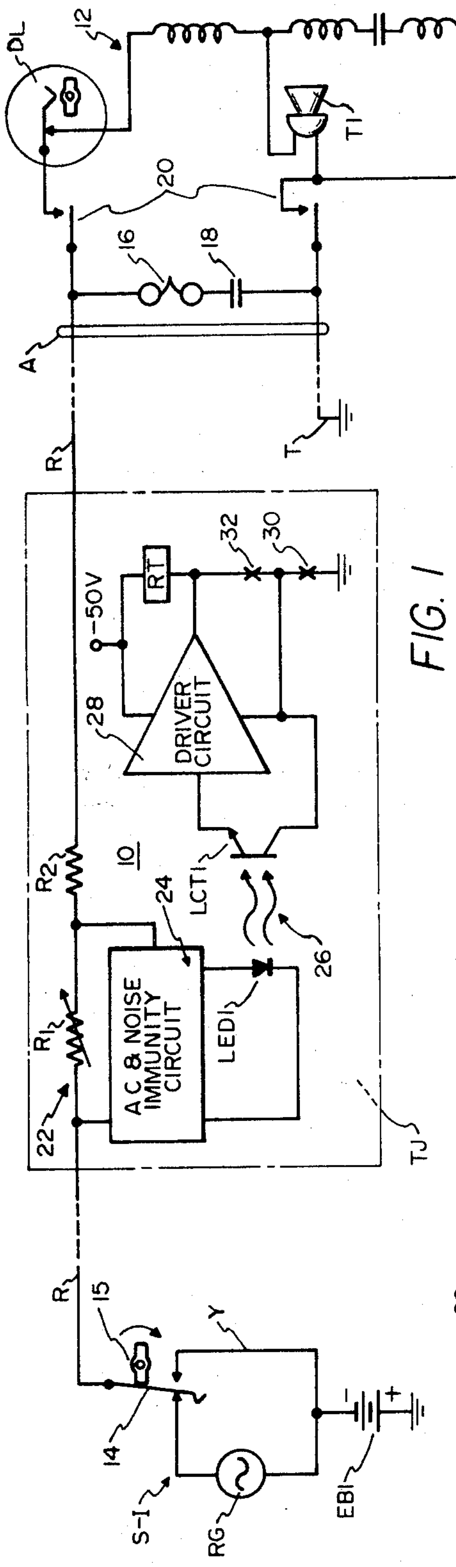
FIG. 1 is a partial block and partial schematic representation of a ringing circuit employing a phototransistor coupled pair as an optical coupler in accordance with the present invention.

FIG. 1 is representative of a common ring trip arrangement wherein a ringing circuit 10 is shown as a part of a terminating junctor circuit TJ and is connected in electrical series between battery connected signaling-interrupter source means S-I and a desired called party station apparatus 12. The terminating junctor TJ is the circuit within an electronic central office which advances the call from the so-called group selector to the so-called line group and performs such functions as ringing, ring trip and battery feed. Only the essential accompanying circuitry serving to disclose the invention in a clear and concise manner is shown in the drawing in use with the ring trip arrangement of the present invention. For example, only battery connected ringing is shown but the ringing circuit 10 should be understood to be equally applicable to the use of ground connected ringing.

To the left-hand side of FIG. 1 is shown the signaling-interrupter source means S-I comprised of a ringing generator RG from which is provided the alternating ringing current, an alternate direct switchthrough path marked Y and a switchhook 14 being cyclically switched between its contacts by any suitable means, one such suitable means being a rotatable cam 15. As commonly understood, the cyclic switching occasions a ringing period of approximately 2 seconds duration followed by a silent period of approximately 4 seconds duration. The signaling-interrupter means S-I is connected to the negative side of an exchange battery EB1, which battery has its positive side returned to ground and comprises the −50 volt battery commonly used in the central office.

To the right-hand side of FIG. 1 is shown the equivalent circuit for a station apparatus connected across the tip T and ring R lines of a conventional telephone loop circuit A. The station apparatus is comprised of a ringer device 16, a capacitor 18, a dial apparatus DL, a transmitter T1, a receiver RC1 and a pair of hookswitch contacts 20. With respect to the operation of the ringing circuit 10, during the ringing periods the conduction path of the alternating current is over the ring R line of the loop circuit A, through the ringing circuit 10 to the station apparatus 12, through the ringing device 16 and capacitor 18 and over the tip T line of the loop circuit A to ground potential. Upon the occurrence of an off-hook condition, the hookswitch contacts 20 are made to connect the parallel arrangement of receiver RC1 and transmitter T1 to the loop circuit A. In a well known manner, there is now provided a path for the flow of direct current superimposed upon the alternating ringing current, which direct current is well known to be used to trigger the ringing circuit 10.

Figure 2:
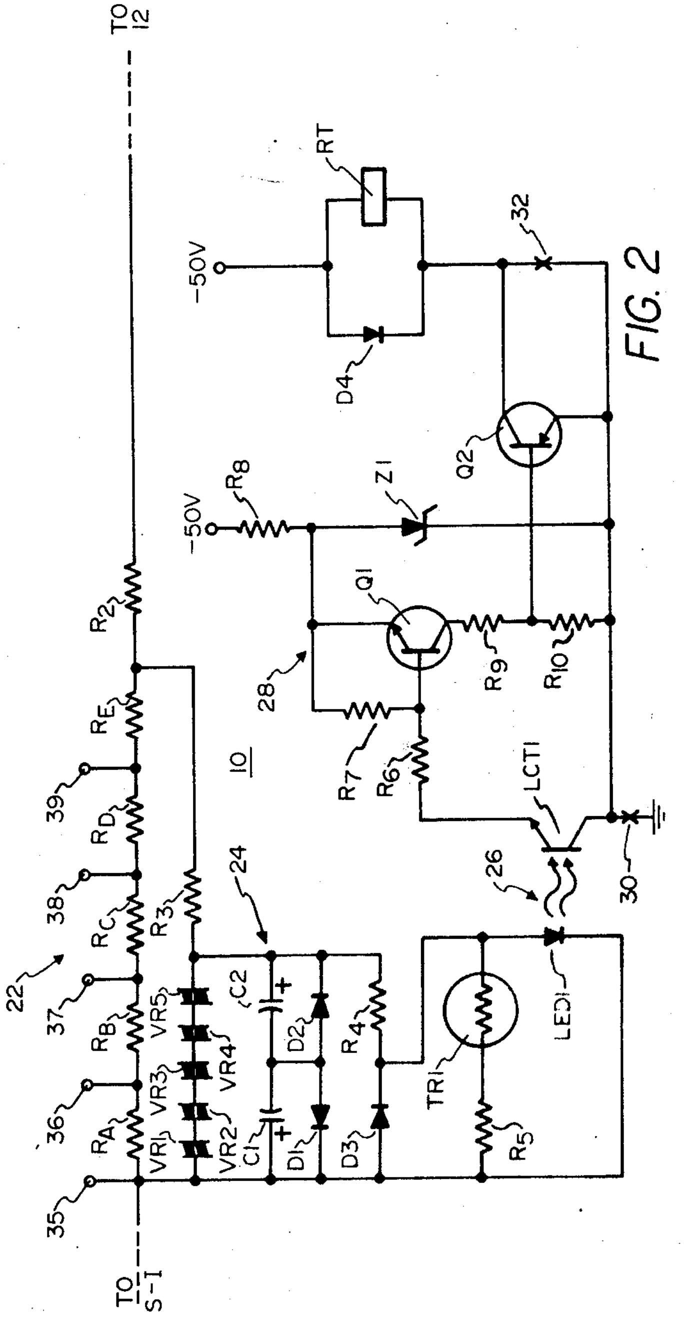
FIG. 2 is a schematic representation of the ringing circuit of FIG. 1.

The ringing circuit 10 as shown in FIG. 1 includes a series connected variable resistor $R_1$ as might be provided by a strapping resistor field 22 of FIG. 2 or by other suitable means. The purpose of the strapping field 22 is to provide the capability to calibrate the ringing circuit 10 for operation in connection with a variety of loop lengths with various operating response times. An a.c. and noise immunity circuit 24 is connected in shunt across the variable resistor $R_1$. A driver amplifier circuit 28 is coupled to the a.c. noise immunity circuit through an optical coupler in the form of a phototransistor coupled pair 26. The phototransistor 26 comprises an NPN silicon planar optical transistor LCT1 and a diffused planar gallium arsenide light emitting diode LED1. The diode light emission varies in its intensity with the current flow through the diode LED1 thereby to control the conduction of the phototransistor LCT1. The attractive feature of this optical coupler is its high isolation resistance and high voltage isolation between its emitter diode and detector transistor. A typical phototransistor coupled pair used in one practice of the present invention is manufactured by the Monsanto Company and designated as MCT2. The driver circuit 26 has as its load the winding of the ring trip relay RT. A pair of make contacts are shown at 30 for providing ground potential to the driver amplifier circuit 28. The make contacts 30 are completed by the terminating junctor TJ control circuitry (not shown) at a point in time beginning the ringing mode in order to enable the driver amplifier circuit 28. A set of contacts 32 of the ring trip relay RT are connected across a portion of the driver circuit 26 for providing a connection of the ring trip relay RT directly to a ground potential upon the operation of the relay whereby the ring trip relay RT is locked to ground potential for maintaining its operative state. When the terminating junctor TJ subsequently removes the ground potential by opening the contacts 30, the ring trip relay RT is de-energized.

There is shown in FIG. 2 the circuitry details of the ringing circuit 10 without repeating the signaling-interrupter means S-I and the station apparatus 12. The strapping resistor field 22 previously mentioned is comprised of the series connected resistors $R_A$, $R_B$, $R_C$, $R_D$ and $R_E$ together with accompanying connection points 35 through 39 which provide the capability to vary the resistance value actually inserted in the R line. Another resistor $R_2$ is connected in series with the strapping resistor field 22 within the R line. The series resistor $R_2$ aids in protecting the ringing generator RG from electrical overlaod conditions should the ring trip relay RT fail to trip.

In a series loop connected in electrical parallel with the strapping field 22, there is provided a pair of capacitors C1 and C2 and a resistor $R_3$. The capacitors C1 and C2 are preferably provided as bipolar capacitors. A pair of general purpose silicon diodes D1 and D2 are connected in series with each other and in shunt across the capacitors C1 and C2, respectively, the diodes D1 and D2 being poled in the circuit oppositely with respect to each other for conducting on opposite half cycles of the alternating ringing current. A plurality of voltage variable resistors or varistors VR1, VR2, VR3, VR4 and VR5 are connected in series with each other and the plurality of varistors are then connected in parallel with the pair of capacitors C1 and C2. The varistors provide protection to the a.c. and noise immunity circuit 24 and to the diode LED1 from excessive voltage potentials being applied across the capacitors C1 and C2. For example, particular varistors are selected to limit the voltage appearing across the capacitors to no more than some 3.5 volts. The diodes D1 and D2 protect their shunt connected capacitors C1 and C2 from harmful reverse voltages, respectively.

In another series loop also connected in electrical parallel with the strapping field 22 as well as in parallel with the capacitors C1 and C2 and the diodes D1 and D2, there is provided a resistor $R_4$ and the light emitting diode LED1. The diode LED1 is connected in a direction of polarity of anode to cathode away from the resistor R4. A general purpose silicon diode D3 is connected in shunt across the diode LED1 in a direction of polarity for protecting the diode LED1 from reverse voltages. Additionally, a series combination of a resistor R5 and a thermistor TR1 are connected in parallel across the diode LED1 for providing temperature compensation whereby as the ambient temperature for the circuit increases, more current is shunted around the diode LED1, it being desired that the current conducted by the diode LED1 remain at a relatively constant level. Essentially, the varistors VR1–VR5, the capacitors C1 and C2, the diodes D1 and D2, and the resistor R3 comprise the a.c. and noise immunity circuit.

The phototransistor LCT1 has its emitter connected to the base terminal of an NPN transistor Q1 through a base bias resistor $R_6$. The transistor Q1 includes, of course, the standard configuration of emitter and collector terminals, which emitter terminal is connected to the junction between a pair of resistors $R_7$ and $R_8$. The collector terminal is returned to ground potential through the series connected resistors $R_9$ and $R_{10}$ and the TJ make contacts 30. The resistor $R_7$ has its other terminal connected to the base terminal of the transistor Q1, and the other terminal of the resistor $R_8$ is connected to a negative operating potential such as the −50 volt exchange battery. A zener diode Z1 is connected from the emitter terminal of the transistor Q1 to ground potential and provides a series path from the negative −50 volt supply through resistor $R_8$ and the zener diode Z1 to ground for comprising a shunt voltage regulator arrangement. This shunt voltage regulator serves to reduce the negative −50 volt supply seen by the transistor Q1 permitting the transistor Q1 to be interfaced with the low voltage transistor LCT1.

An PNP transistor Q2 having base, emitter and collector terminals is provided as a second stage of the driver amplifier circuit 28 and is used to directly operate the ring trip relay RT. The base terminal of the transistor Q2 is connected to the junction between the series resistors $R_9$ and $R_{10}$ which resistors then serve as a voltage divider network to provide bias to the base of the transistor Q2. The emitter terminal of transistor Q2 is returned directly to ground potential and the collector terminal is connected to the −50 volt supply through the winding of the ring trip relay RT comprising the load for the driver amplifier circuit 28. The transistor Q2 is protected from inductive transients resulting from the restoration of the ring trip relay RT by the general purpose diode D4 being poled anode to cathode away from the supply and connected in shunt across the relay winding.

There is provided a scheme whereby a set of normally open contacts 32 of the ring trip relay RT are connected in a circuit path extending between the grounded emitter terminal and the relay connected collector terminal of the transistor Q2. When the winding of the ring trip relay RT is energized and the relay RT is operated, the contacts 32 are closed to complete a path whereby the winding of the relay RT is grounded and the relay RT is locked in an energized state. The operation of the ring trip relay RT should be understood to be effective to disconnect the signaling-interrupter means S-I and the ringing circuit 10 from the R line of the station apparatus 12. The control circuitry within the terminating junctor TJ which would serve to accomplish the removal of the ringing current from the called party line is thought to be well within the state of the art to provide. Hence, in the interest of a more brief but full, clear and concise disclosure, only the novel circuitry used to trip the ring trip relay RT is shown in the drawing. Also, it should be apparent that it is not absolutely necessary that the ringing circuit be removed from the called party line immediately upon the occurrence of an off-hook response. The novel circuit of the present invention could be provided so as to remain connected in the R line of the talking loop circuit, if desired.

Further, for the purpose of providing increased reliability through redundancy, another phototransistor coupled pair (not shown in the drawing) could be provided in parallel with the phototransistor coupled pair 26, in which case the first phototransistor to operate would then operate the driver amplifier circuit 28.

In the operation of the ringing circuit 10, when the applied alternating ringing current traverses the R line for ringing the station apparatus 12, the ringing current flow path is divided between the strapping field 22 and the pair of capacitors C1 and C2, thus to by-pass completely the diode LED1. The capacitors C1 and C2 exhibit low impedances at ringing frequencies which range from approximately 16 Hz. to 67 Hz. During the positive half cycle occurrences of ringing current, the polarity of the diode D2 is such that it conducts and the primary current flow passes through the capacitor C1 and the diode D2. Since the capacitance of both C1 and C2 is relatively large, the resulting charge on the capacitors is negligible. The primary purpose of the capacitors is to serve as a low impedance path for alternating current. The diode D1 is non-conductive during the positive half cycles of ringing current. During the negative half cycle occurrences of ringing current, the diode D2 is non-conductive and the diode D1 conducts instead. The primary current flow is traceable through the capacitor C2 and the diode D1. The ohmic value of the resistor $R_3$ is relatively high with respect to the ohmic value of the strapping field 22 for splitting the heavier current flow through the strapping field.

Now upon the answered response at the station apparatus there is provided in a well known manner a d.c. path for the loop circuit A and the ringing circuit 10 is traversed during ringing intervals by d.c. current superimposed upon the a.c. ringing current, and d.c. current only during the silent intervals. Referring to FIG. 2, the path for direct current is seen to extend through the strapping field 22 and through the parallel leg of the resistors $R_3$ and $R_4$ and the diode LED1. Of course, some current is split from the diode LED1 through the series connected resistor $R_5$ and the thermistor TR1 so as to provide the temperature compensation function previously mentioned. The conduction of the diode LED1 operates the phototransistor LCT1 for energizing the ring trip relay winding. The high ohmic value of the resistor $R_3$ and the large capacitance values of the capacitors C1 and C2 are effective to provide a sufficient RC time constant whereby the conduction TURN-ON of the diode LED1 is delayed. The delay is intended to accomplish a certain degree of immunity to false trips of the ring trip relay RT such as might be caused by large magnitudes of ringing current required by multiple connected ringers, short loops and direct current fault conditions. Most ring trip circuits provide some emans for delaying the ring trip to protect against false trips and some such circuits provide a delay in signaling the common control that the ring trip has occurred. At any rate, the particular circuit arrangement used in the ringing circuit 10 for accomplishing this delay is thought to be one of the unique features of the present invention.

Initially, when the terminating junctor TJ is idle, the ring trip relay RT is unenergized and inoperative and the phototransistor LCT1 and transistors Q1 and Q2 are cutoff. When a call for service is sensed by the central office call processing equipment, the terminating junctor TJ connects the ringing circuit 10 and signaling-interrupter means S-I to the desired called party loop circuit A. The ground potential is then connected to enable the driver amplifier circuit 28 through closure of contacts 30. As the ring is answered, the phototransistor LCT1 is driven on by the conduction of the light emitting diode LED1. The transistor Q1 is biased for being driven on by the conduction of the phototransistor LCT1. There are often relatively major variations in operating characteristics between different phototransistor coupled pair units of the same type such as the MCT2. These variations could cause the turn on time of the transistor Q1 to vary so that some degree of control over the energization of the relay winding would be lost. Accordingly, it is desirable that the threshold cuton level of the transistor Q1 be designed to respond to a minimum conduction level of the phototransistor LCT1. Since the minimum cuton level of the phototransistor coupled pairs of the same type are largely uniform and predictability, there is provided a fast response of the driver amplifier circuit 28 to the conduction of the phototransistor LCT1. With the conduction of Q1, the transistor Q2 is driven on and supplies collector current through the load winding of the ring trip relay RT. It should be noted that even though the driver amplifier circuit 28 includes two amplifying stages, the transistor Q1 could be elimianted and the transistor Q2 connected directly to the transistor LCT1 by connecting the base of Q2 to the resistor $R_6$ if the transistor Q2 could be successfully interfaced with the low voltage phototransistor LCT1 and yet have sufficiently high gain to energize the load winding of the relay RT.

Further, the contacts 32 may be provided as early make contacts so that it is assured that the relay RT will remain operated by means of the direct ground potential connection previously described. This is preferable because the ringing function is usually taken down through operation of one of the multiple sets of contacts of the ring trip relay RT. Obviously, there is a possibility that the power to the ringing circuit 10 could be removed before the contacts 32 were either operated or set in their operation and ring trip would be lost.

In one particular embodiment for the ringing circuit 10, the following component values were selected, to wit: $R_A$ — 2.4 ohms, ½ watt; $R_B$ — 5.1 ohms, ½ watt; $R_C$ — 10 ohms, 1 watt; $R_D$ — 20 ohms, 1 watt; $R_E$ — 75 ohms, 2 watts; $R_2$ — 220 ohms, 2 watts; $R_3$ — 1 Kohm, 2 watts; $R_4$ — 220 ohms, ½ watt; $R_5$ — 2.7 Kohm, ½ watt; C1 and C2 — 220 microfarads; TR1 — 5 Kohms; $R_6$ — 22 Kohms, ½ watt; $R_7$ 330 Kohm, ½ watt; $R_8$ and $R_9$ — 10 Kohm, ½ watt; $R_{10}$ — 22 Kohm, ½ watt. The transistors Q1 and Q2 are general purpose silicon transistors; the zener diode Z1 is an 18 volt zener; the overall gain of the Q1 and Q2 amplifier stages is in the order of 100; and the ring trip relay RT is a miniature telephone relay having multiple sets of contacts and susceptible to be mounted on a printed circuit board. The relay RT could be a GTE Automatic Electric Series H relay, operating sensitivity of 160 ampere-turns and the winding of which consists of some 12,500 turns. Ring trip operate times range from 16 milliseconds with zero loop impedance to 166 milliseconds with 2,800 ohms loop impedance with an applied ringing voltage of approximately 105 volts rms at a frequency of 20 Hz.

It is to be understood that while the present invention has been shown and described with reference to the preferred embodiments thereof, the invention is not limited to the precise forms set forth, and that various modifications and changes may be made therein without departing from the spirit and scope of the present invention.

What is claimed is:

1. In a ringing circuit for a two-wire communication switching system including a ring trip relay, said ringing circuit traversed primarily during ringing intervals by alternating current and traversed when the ringing is answered by direct current as well, a ring trip arrangement comprising first circuit means for conducting alternating current and electrical transient currents and including first resistor means connected in a selected one of said two wires and capacitor means connected in shunt across said first resistor means, at least one optical coupler means having a light emitting diode and a light coupled transistor, said light coupled transistor being operated by said diode upon electrical conduction thereof, second circuit means for conducting direct current and including second resistor means and said light emitting diode connected in electrical series with each other and connected in shunt across said capacitor means, said light emitting diode being poled to conduct said direct current, and driver circuit means having the input thereof supplied by said operated light coupled transistor and having the output thereof connected to the winding of said ring trip relay for energizing said winding when said light coupled transistor is operated thereby to trip the ring.

2. A ring trip arrangement as claimed in claim 1 wherein said capacitor means comprises a pair of capacitors connected in electrical series, a pair of rectifying means are connected in electrical series with each other and in shunt with said capacitors, respectively, to form two shunt circuit combinations connected in series, and said rectifying means are oppositely poled with respect to each other for conducting unidirectional currents therethrough during opposite half cycles of said alternating current for alternately providing a series circuit path for said alternating current extending through the capacitor of one shunt circuit combination and the rectifying means of the other shunt circuit combination.

3. A ring trip arrangement as claimed in claim 2 wherein said first circuit means includes a plurality of voltage variable resistor devices connected in series with each other and collectively connected in shunt across said pair of capacitors and across said first resistor means for limiting the voltage potential to be applied across said pair of capacitors and across said resistor means.

4. A ring trip arrangement as claimed in claim 3 wherein said first resistor means comprises a variable resistor means for adjusting the voltage drop across said first circuit means.

5. A ring trip arrangement as claimed in claim 1 wherein said light emitting diode has rectifying means connected in shunt therewith and oppositely poled with respect thereto for providing protection against reverse voltage potentials, and temperature variable resistor means connected in shunt across said light emitting diode for providing temperature compensation for the operation of said light emitting diode.

6. A ring trip arrangement as claimed in claim 1 wherein said second resistor means of said second circuit means and said capacitor means of said first circuit means present a preselected time constant for providing a predeterminable time delay between direct current flow in said ringing circuit and the conduction of said direct current by said light emitting diode and thus the operation of said ring trip relay.

7. A ring trip arrangement as claimed in claim 1 wherein said ring trip relay includes at least one normally open contact set connected in series with the winding of said ring trip relay for providing a direct circuit connection to said ground potential when said ring trip relay is operated, whereby said ring trip relay is locked in the operated state.

8. A ring trip arrangement of a ringing circuit traversed by both alternating and direct current and including a ring trip relay, said ring trip arrangement comprising first resistor means connected in the called party loop circuit, an a.c. and noise immunity circuit including a pair of capacitors connected in series with each other and in parallel with said first resistor means, a pair of oppositely poled diode rectifiers connected in series with each other and in parallel with said pair of capacitors, respectively, for providing two series shunt circuit combinations, the capacitor of one of these shunt circuits and the diode rectifier of the other of the shunt circuits comprising alternate current paths during opposite polarity half cycles of said alternating current, optical coupler means having a light emitting diode and a light coupled transistor, said light coupled transistor being operated by said diode upon electrical conduction thereof, direct current conducting circuit means including second resistor means and said light emitting diode connected in electrical series with each other and connected in shunt across said capacitor means, and said diode being poled to conduct said direct current, driver circuit means having the input thereof supplied by said operated light coupled transistor and having the output thereof connected to the winding of said ring trip relay for energizing said winding when said light coupled transistor is operated thereby to trip the ring.

* * * * *